United States Patent
Plunk et al.

(10) Patent No.: US 7,296,911 B2
(45) Date of Patent: *Nov. 20, 2007

(54) SURFACE MOUNT FLUORESCENT STRIP LIGHT FIXTURE RETROFIT KIT AND METHOD

(75) Inventors: Carlton Plunk, Saltillo, MS (US); Christopher Patrick Warner, Hamilton, AL (US)

(73) Assignee: Genlyte Thomas Group, LLC, Louisville, KY (US)

( * ) Notice: Subject to any disclaimer, the term of this patent is extended or adjusted under 35 U.S.C. 154(b) by 96 days.

This patent is subject to a terminal disclaimer.

(21) Appl. No.: 11/027,210

(22) Filed: Dec. 30, 2004

(65) Prior Publication Data

US 2006/0018116 A1    Jan. 26, 2006

Related U.S. Application Data

(63) Continuation-in-part of application No. 10/722,645, filed on Nov. 26, 2003, now Pat. No. 7,080,923.

(60) Provisional application No. 60/429,921, filed on Nov. 30, 2002.

(51) Int. Cl.
    *F21S 4/00* (2006.01)
(52) U.S. Cl. .................. 362/221; 362/225; 362/374

(58) Field of Classification Search .............. 362/217, 362/220–222, 225, 260, 274–275, 374–375
See application file for complete search history.

(56) References Cited

U.S. PATENT DOCUMENTS

| | | | | |
|---|---|---|---|---|
| 2,530,582 | A * | 11/1950 | Neuman ................. | 362/346 |
| 5,132,886 | A * | 7/1992 | Hoag et al. ............. | 362/221 |
| 5,371,661 | A * | 12/1994 | Simpson ................. | 362/220 |
| 5,440,466 | A * | 8/1995 | Belisle et al. .......... | 362/222 |
| 5,988,829 | A * | 11/1999 | Holder ................... | 362/217 |
| 6,010,230 | A * | 1/2000 | Schmidt et al. ......... | 362/221 |
| 6,210,019 | B1 * | 4/2001 | Weathers ................ | 362/220 |
| 6,439,741 | B1 * | 8/2002 | Diaz et al. .............. | 362/217 |
| 6,739,734 | B1 * | 5/2004 | Hulgan .................. | 362/243 |
| 6,752,513 | B2 * | 6/2004 | Plunk .................... | 362/150 |
| 6,820,997 | B2 * | 11/2004 | Bissada .................. | 362/216 |
| 6,869,205 | B1 * | 3/2005 | Yan ....................... | 362/260 |
| 6,964,502 | B1 * | 11/2005 | Verfuerth ............... | 362/296 |
| 2005/0146867 | A1 * | 7/2005 | Kassay et al. .......... | 362/217 |

* cited by examiner

*Primary Examiner*—Thomas M. Sember
(74) *Attorney, Agent, or Firm*—John F. Salazar; Middleton Reutlinger

(57) ABSTRACT

A retrofit unit for a fluorescent lighting fixture having a chamber with a ballast and a plurality of downwardly extending lamp holders for enclosing an existing fluorescent strip light fixture, wherein neither the ballast nor the lamp holders of the existing fluorescent lighting fixture need be removed to receive this retrofit unit.

8 Claims, 11 Drawing Sheets

SURFACE MOUNT FLUORESCENT STRIP LIGHT FIXTURE RETROFIT KIT AND METHOD

CROSS-REFERENCE TO PRIOR APPLICATION

This application claims priority to and is a continuation-in-part of U.S. Nonprovisional patent application Ser. No. 10/722,645, filed on Nov. 26, 2003 now U.S. Pat. No. 7,080,923, which claims priority to and benefit of U.S. Provisional Patent Application Ser. No. 60/429,921, filed on Nov. 30, 2002.

BACKGROUND OF THE INVENTION

1. Field of the Invention

This invention relates to surface mount fluorescent strip light fixtures, and, more particularly, to a retrofit kit and method of retrofitting for surface mount fluorescent strip light fixtures.

2. Description of Related Art

Surface mount fluorescent strip light fixtures are installed to provide general lighting of large indoor spaces. It should be understood that the description of the fixtures as 'surface mount' type fixtures is intended to distinguish the fixtures from 'recessed' type fixtures. Thus, the invention taught herein will apply to all 'surface mount' type fluorescent strip light fixtures, including stem and pendant mounted suspended variations as well as those fixtures mounted directly to a ceiling.

Typically, such strip fixtures include a channel in the form of an inverted trough, with the channel being attached to the ceiling. Lamp holders (sockets) are attached to the channel. A ballast is attached within the channel and wiring attaches the ballast to the lamp holders. Power is supplied to the ballast by wiring brought into the channel through the top or end of the channel. A ballast cover is used to close the open face of the channel so that the ballast and wiring are enclosed. Linear fluorescent lamps are then placed in the lamp holders for operation of the fixture. The lamps are left bare and exposed for providing light to the space. Because of their low cost and utilitarian use, the surface mount fluorescent strip light fixture is the best selling light fixture of all time. Thus, as used herein, surface mount fluorescent strip light fixtures shall be understood to include all fixtures having this basic configuration.

Typical uses include retail stores, such a grocery, drug, and department stores, where the fixtures are commonly mounted in continuous rows. The fixtures are also used in warehouses.

Since the introduction of the fluorescent lamp at the 1939 World Fair, fluorescent lighting technology has greatly advanced. Particularly in response to the energy crisis of the 1970's and the National Energy Policy Act of 1992, lamp and ballast manufacturers have developed fluorescent lamp-ballast systems with improved efficiencies. For example, electronic ballasts are now capable of more efficient operation than older technology magnetic ballasts. Additionally, the newer, energy saving fluorescent lamps have special lamp holder and/or ballast requirements.

There are a large number of fixtures in the market that use obsolete technology. Consumers desire to reduce their utility costs, and the newer technology can save 25%, or better, in such costs. However, for existing installations, implementation of the newer technology means either replacing the individual fixture components (ballast, lamp holders, wiring, and lamps) or replacing the fixtures all together. Both processes are time consuming and labor intensive, requiring 30 minutes or so for each fixture retrofit or replacement. Further, the retrofit process requires closing down sections of a store during the construction, increasing the impact of the time and effort required to retrofit or replace the old fixtures. Thus, there is a need for a retrofit kit and method for surface mount fluorescent strip light fixtures that can be installed with a minimum of time and labor.

Additionally, current retrofit or replacement options for old fixtures requires disposal of the old ballast, lamp holders, wiring, and lamps, or the entire fixture all together, creating disposal costs and other issues. For instance, many old ballasts contain hazardous materials and require disposal treatment as such. Thus, there is a further need for a retrofit kit and method for surface mount fluorescent strip light fixtures that minimizes the disposal issues of the retrofit process.

BRIEF SUMMARY OF THE INVENTION

Thus, it is an object of the present invention to provide a retrofit kit and method of retrofitting existing fluorescent strip light fixtures with a replacement lamp-ballast system.

It is a further object of the present invention to provide a kit and a method for retrofitting an existing fluorescent strip light fixture that can be installed with a minimum of time and labor.

It is even a further object of the present invention to provide a retrofit kit for an existing fluorescent strip light fixture that minimizes the disposal issues of the retrofit process.

BRIEF DESCRIPTION OF THE SEVERAL VIEWS OF THE DRAWINGS

FIG. 4 is show with the second side wall door removed so that the wiring details are more clearly visible.

DETAILED DESCRIPTION OF THE INVENTION

Figure 1:
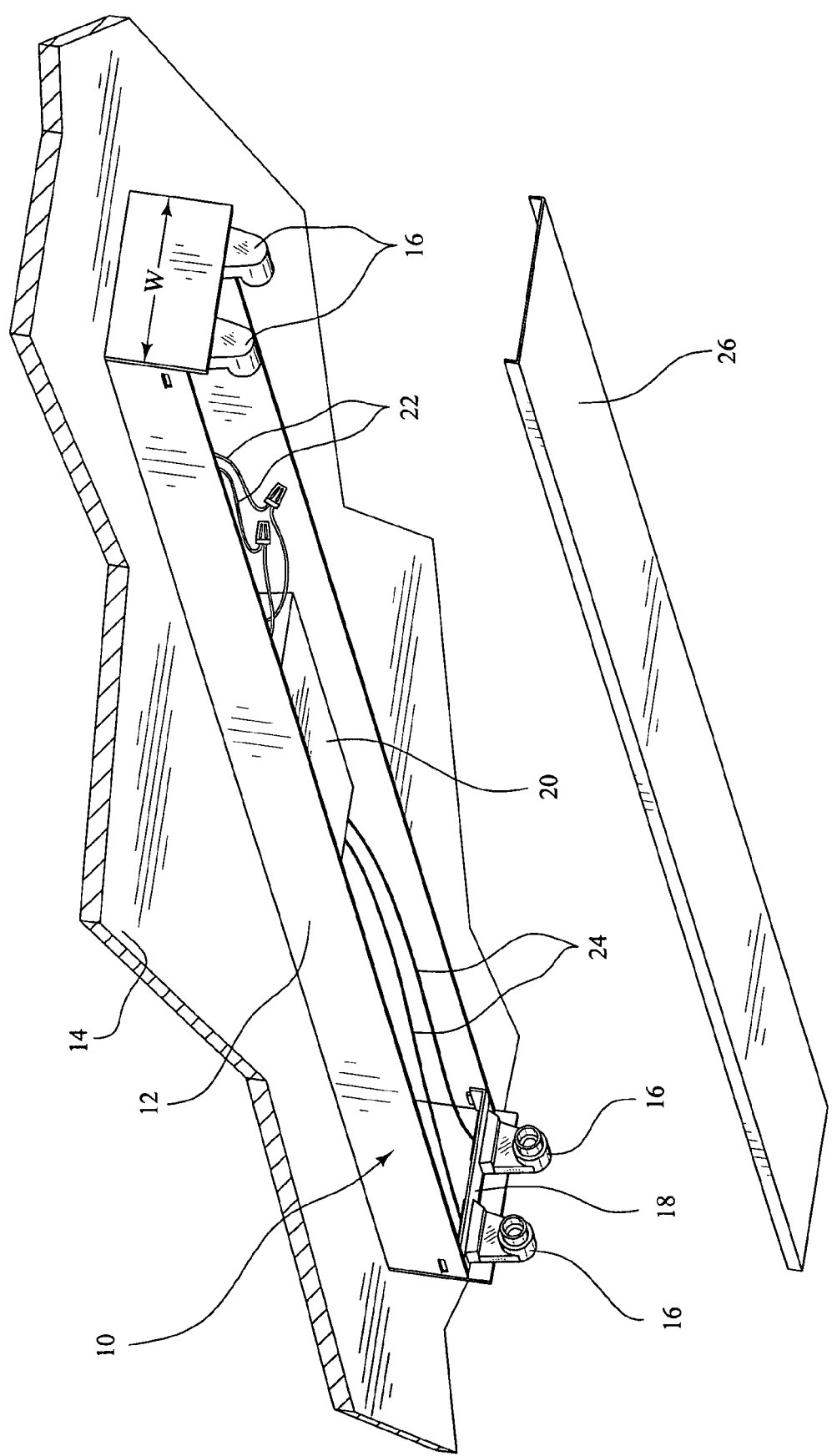
FIG. 1 shows an exploded view of an existing surface mount fluorescent strip light fixture

As shown in FIG. 1, an existing surface mount fluorescent strip light fixture 10 has an existing strip channel 12 in the form of an inverted trough, with the existing channel 12 being attached to a ceiling 14. As mentioned earlier, surface mount type fluorescent strip fixtures may also be suspended from a ceiling by a stem or other pendant type suspension system, and it should be understood that the principles taught herein will apply equally to any surface mount type fluorescent strip fixture whether it is suspended or mounted directly to a ceiling. The existing channel 12 has a width, w, as shown, which is typically around 4-⅛ inches to 4-¼ inches. The existing fixture 10 has lamp holders 16 which are commonly attached to a saddle piece 18, which is, in turn, suspended between the walls of the existing channel 12. The existing fixture also has a ballast 20, which is contained within the existing channel 12. Power is supplied to the ballast by power supply leads 22 brought into the channel 12, and the ballast 20, in turn, provides power to the lamp holders 16 by existing lamp holder wiring 24. A ballast cover 26 covers the open face of the existing channel 12 to enclose the ballast 20, power wiring 22 and lamp holder wiring 24.

Preparation of the existing strip fixture 10 for retrofitting with the retrofit kit and method of the present invention includes: disconnecting power to the existing strip fixture 10; removing the existing lamps (already removed from the existing fixture shown in FIG. 1); and removing the ballast cover 26. The existing lamps and the ballast cover 26 will be the only components of the existing strip fixture 10 which require disposal in the retrofit process according to the instant invention.

As shown in FIGS. 2-7, the surface mount fluorescent strip light fixture retrofit kit of the present invention is comprised of two mounting brackets 28 and a retrofit channel 30. The brackets 28 attach to the existing strip channel 12. The retrofit channel 30 hangs from the brackets 28 and wraps around the remaining components of the existing fixture 10.

Figure 2:
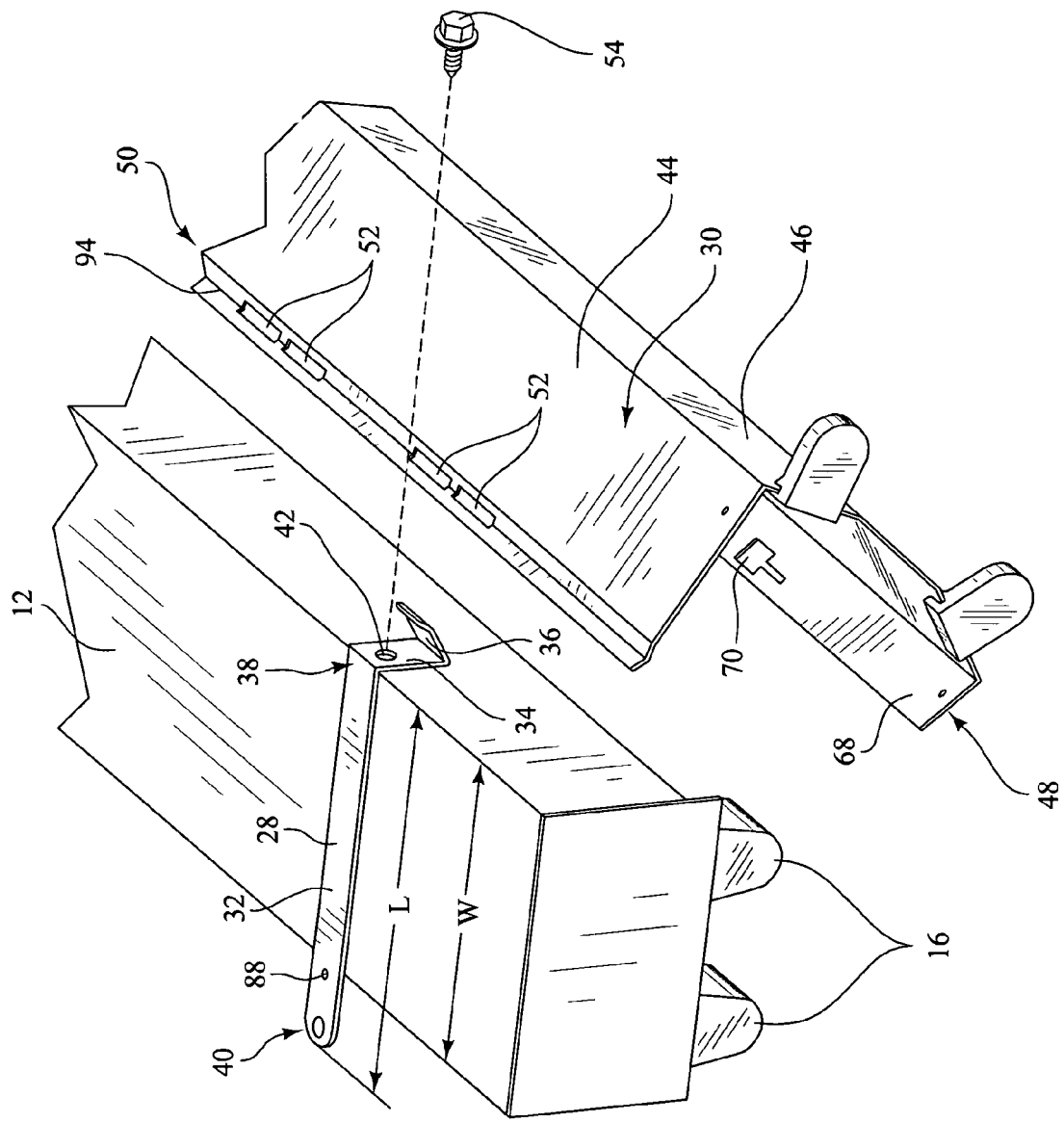
FIG. 2 shows a partial perspective view of an existing surface mount fluorescent strip light fixture and a retrofit kit according to the present invention, particularly showing a mounting bracket attached to the existing fixture in alignment with slots in a retrofit channel.

More specifically, as shown in FIG. 2, each mounting bracket 28 has a horizontal arm 32, a depending leg 34, and an upturned hook section 36. The horizontal arm 32 has a first end 38 and a second end 40 and a length, 1, which is longer than the width, w, of the existing channel 12. The depending leg 34 extends downward from the first end 38 of the horizontal arm 32 and conforms generally to the shape of the channel 12. The upturned hook section 36 extends upward and outward from the bottom end of the depending leg 34, forming a hook-like structure therewith. The depending leg 34 contains a fastener hole 42. Preferably, the mounting brackets are made of a heavy gauge (16 gauge or 18 gauge) galvanized steel for strength.

The retrofit channel 30 has the form of a non-inverted trough, generally, having a first side wall 44, a bottom wall 46, and a second side wall 48 (shown only partially in FIG. 2). As mentioned earlier, the retrofit channel 30 is proportioned to wrap around the existing fixture 10, including the existing channel 12, lamp holders 16, and ballast 20 without the need to remove or dispose of those components. The first side wall 44 of the retrofit channel 30 has an upper end 50 with slots 52 formed therein. The slots 52 are each configured to receive the upturned hook section 36 of the mounting brackets 28.

Figure 3:
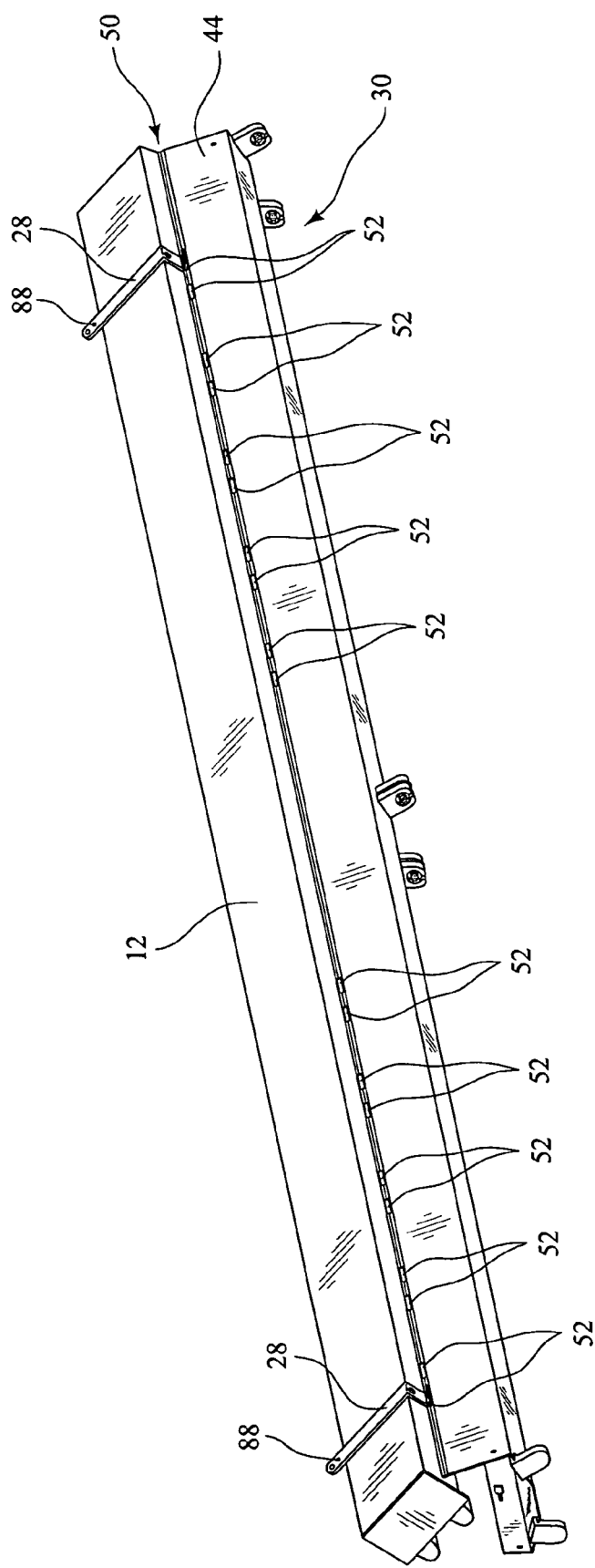
FIG. 3 shows a perspective view of an existing surface mount fluorescent strip light fixture and the retrofit kit of the present invention, particularly showing the retrofit channel hanging on the mounting brackets.

As shown in FIG. 3, multiple slots are formed along the upper end 50 of the first side wall 44.

Thus, the mounting brackets 28 are installed to the existing channel 12 by slipping each bracket 28 between the ceiling and the existing channel 12 so that the upturned hook section 36 lines up with a slot 52 in the retrofit channel 30, as shown in FIG. 2. A template may be utilized for this alignment, or the installer may simply use a ruler or other measuring device to make the alignment. Should the selected position for installation of a bracket 28 be obstructed by a fastener connecting the existing channel 12 to the ceiling, or a boss on top of the existing channel 12, an alternate location may be easily selected by relocating the mounting bracket 28 to an alternate location free of obstructions that lines up with an alternate slot 52. Should the existing fixture 10 have a suspended mounting arrangement, the mounting brackets can just be laid on top of the existing channel 12. Should the existing channel 12 be mounted so close to the ceiling that the mounting brackets 28 will not fit in the space between the existing channel 12 and the ceiling, the bracket may be driven through the space with a hammer. Following positioning of the mounting brackets 28 on top of the existing channel 12, small pilot holes may be created in the existing channel 12 in alignment with the fastener holes 42 in the depending legs 34 of each mounting bracket 28. Thus, the mounting brackets 28 may be fastened to the existing channel 12 with fasteners, such as screws 54 through the fastener holes 42 and the pilot holes.

Upon fastening of the mounting brackets 28 to the existing channel 12, the retrofit channel 30 may be hung by the slots 52 on the upturned hook sections 36 of the mounting brackets 28, as best shown in FIG. 3.

Figure 4:
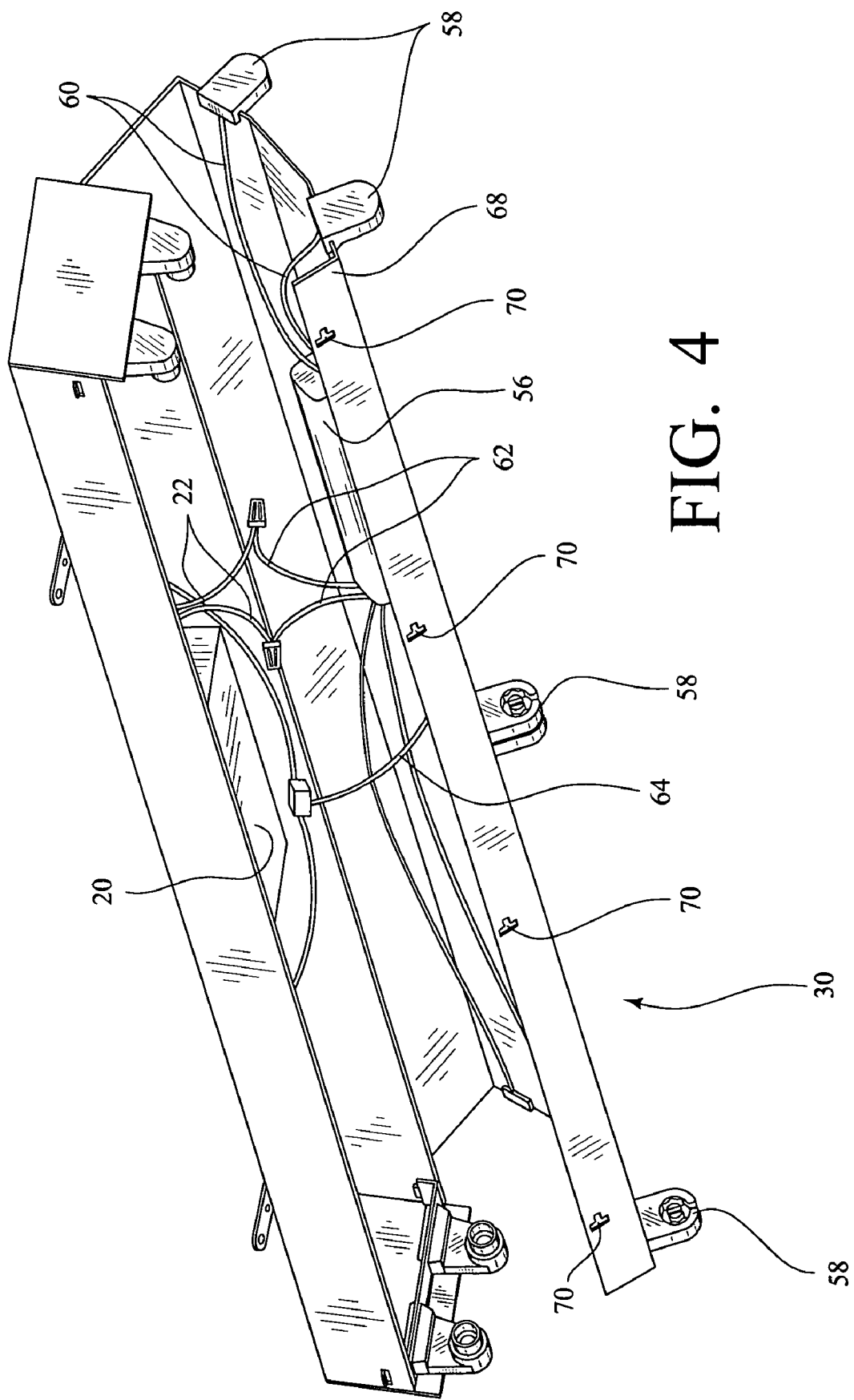
FIG. 4 shows a different perspective view of the arrangement of FIG. 3, particularly showing the ballast and ballast wiring of the retrofit kit of the present invention.

As shown in FIG. 4, a retrofit ballast 56 and retrofit lamp holders 58 are attached to the retrofit channel 30, and are connected by retrofit lamp holder wiring 60. The design of the retrofit kit and method of retrofitting of the present invention enables attachment of the retrofit ballast 56 and lamp holders 58, and the connection of the retrofit lamp holder wiring 60 to be performed during the manufacturing of the kit at the factory. Thus, the installer of the kit at the retrofit site does not have to devote time or labor to these tasks.

As further shown in FIG. 4, the retrofit ballast 56 has power leads 62 and the retrofit kit has a ground lead 64.

The next step in installation of the retrofit kit is to disconnect the power supply leads 22 from the existing ballast 20 and connect the power supply leads 22 to the retrofit ballast power leads 62. Additionally, the retrofit kit ground lead 64 should be connected to a through feed ground wire or other ground wire in the existing fixture.

The mounting bracket upturned hook section 36 and retrofit channel slots 52 create a hinge that allows the retrofit channel 30 to hang from the mounting brackets 28 in a position such that interior portion of the retrofit channel 30 is accessible to the installer for making the described electrical connections, as shown in FIGS. 3 and 4.

Figure 5:
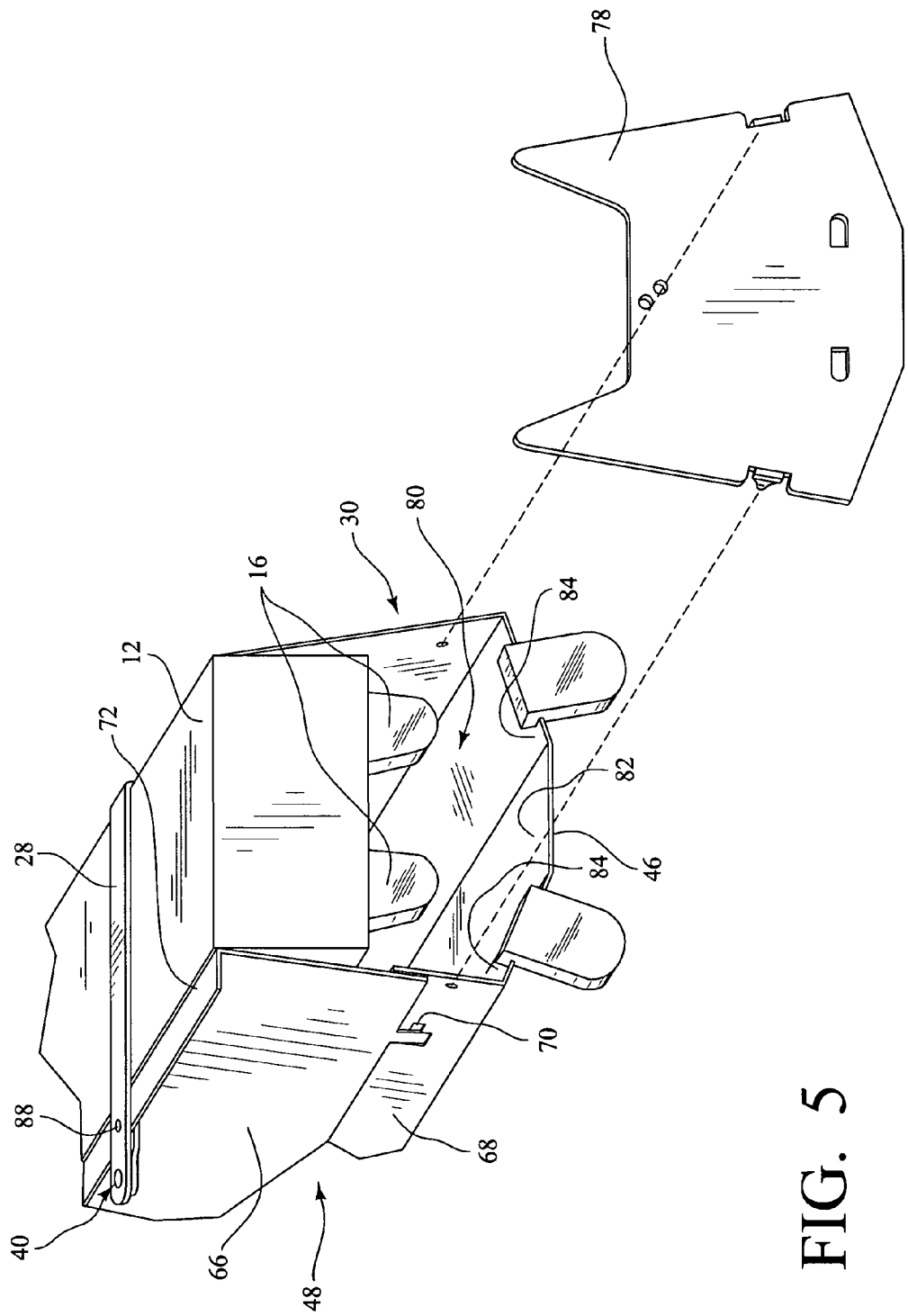
FIG. 5 shows a partial perspective view of an existing surface mount fluorescent strip light fixture and the retrofit kit of the present invention, particularly showing the retrofit kit swung into position around the existing fixture.

Further facilitating access to the installer for making the electrical connections, the retrofit channel second side wall 48, best shown in FIG. 5, can be fabricated as having a door section 66 and a lower section 68. In the embodiment shown, the door section 66 is hinged to the lower section 68 through the use of a plurality of T-slots 70 along the upper end of the lower section (see FIG. 4) and mating hooks (not shown) formed along the lower edge of the door section 66. This hinged arrangement of the door section 66 and lower section 68 of the second side wall 48 enables the door section 66 to be opened for easier access to the interior portion of the retrofit channel 30.

It should be observed that the door section 66 has been removed from the views of FIGS. 2-4 in order to more clearly show the component details of those views. Thus, FIGS. 2-4 show only the lower section 68 of the second side wall 48 of the retrofit channel 30. However, it should be understood that the second side wall 48 of the embodiment shown includes both the lower section 68 and the door section 66.

Returning now to the view of FIG. 5, it is seen that the top portion of the door section 66 has an outwardly turned flange 72. Thus, after the wiring connections are completed, the retrofit kit may be swung up such that the door section flange 72 seats against the underside of the mounting bracket second ends 40 (only one mounting bracket 28 shown in FIG. 5).

Figure 7:
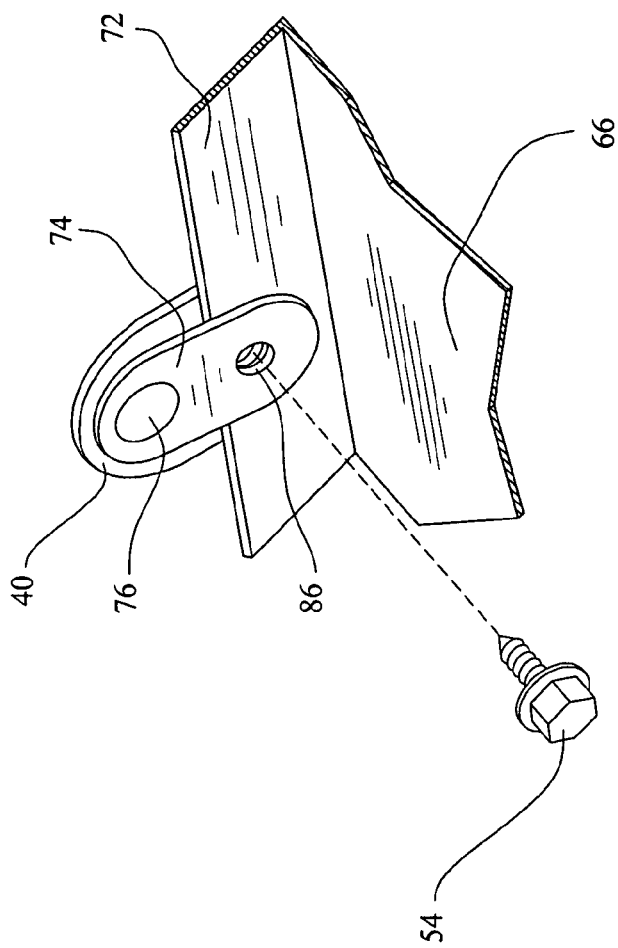
FIG. 7 is another view of the components of FIG. 6, with the thumb latch rotated into engagement with the door section flange.
Figure 6:
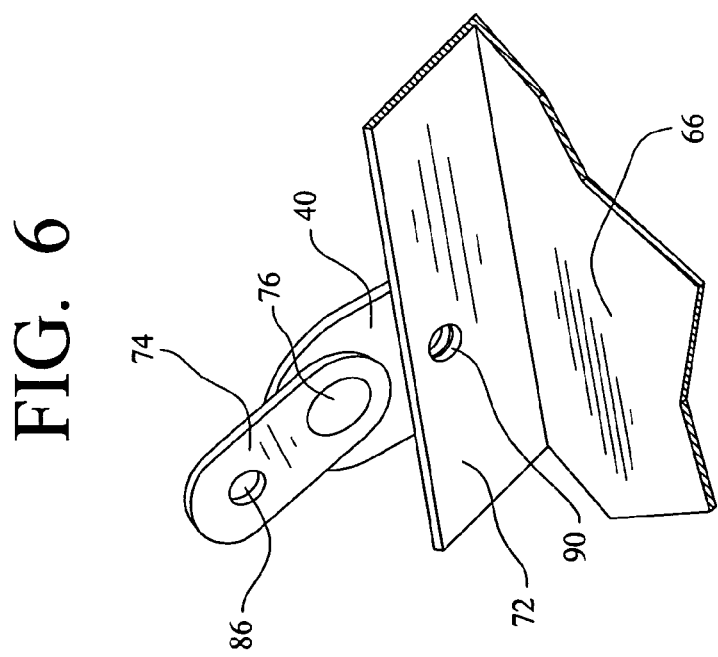
FIG. 6 is a partial perspective view of the mounting bracket and door section outwardly turned flange of FIG. 5.

As best shown in FIGS. 6 and 7, the underside of each mounting bracket second end 40 has a thumb latch 74 rotatably attached thereto by a rivet 76. Thus, the thumb latch 74 of each mounting bracket second end 40 may be rotated out of the way of the door section flange 72 so that it may seat against the underside of each mounting bracket second end 40. Then, the thumb latch 74 of each mounting bracket second end 40 may be rotated so that it engages the under side of the door section flange 72, thereby holding the door section 66, and the retrofit channel 30 in place, as shown in FIG. 5.

As further shown in FIG. 5, the retrofit kit may include end caps 78 which are configured to close the ends of the retrofitted fluorescent strip light fixture, or the ends of a row of retrofitted fixtures. The end caps 78 may be attached to the assembly by any convenient means.

Continuing with the view of FIG. 5, it is seen that the wrap around arrangement of the retrofit channel 30 and the existing channel 12 and existing lamp holders 16 creates a chamber 80 for the retrofit ballast 56 and associated wiring (see FIG. 4) without requiring the removal of the existing ballast 20 (and the associated disposal issues) and associated wiring (see FIG. 1).

Additionally, as shown in FIG. 5, the wrap around arrangement allows the retrofit channel bottom wall 46 to be wider than the existing channel 12. Thus, on the embodiment shown, the bottom wall may have a flat portion 82 in the middle and angled portions 84 on either side of the flat portion. This allows improved optical performance in the two-lamp configuration shown. Additionally, this allows one-lamp and three-lamp versions of the retrofit kit to be produced by installation of lamp holders and a lamp on the flat portion 82 of the bottom wall 46.

Returning now to FIGS. 6 and 7, the embodiment of the invention shown also has a fastener hole 86 located in the thumb latch. Each mounting bracket second end 40 further has a fastener hole 88 positioned to be in alignment with the thumb latch fastener hole 86 when the thumb latch 74 is rotated into engagement with the door section flange 72. Additionally, fastener holes 90 are located at positions in the door section flange 72 corresponding to the slots 52 in the first side wall 44 such that the fastener holes 90 will be in alignment with the thumb latch fastener hole 86 and the mounting bracket second end fastener hole 88. Thus, a fastener 92, such as a screw, may be fastened through thumb latch fastener hole 86, flange fastener hole 90 and mounting bracket second end fastener hole 88 to secure the thumb latch 74 in place and to establish electrical ground continuity between the respective components.

Returning now to FIG. 2, the embodiment of the invention shown also has a groove 94 positioned along the upper end 50 of the retrofit channel first side wall 44 such that the slots 52 are located at the bottom of the groove 94. This configuration enables the installer to more easily position each mounting bracket upturned hook section 36 in a first side wall slot 52 for hanging the retrofit channel 30 from the mounting brackets 28. Additionally, this configuration allows the first side wall groove 94 to seat against the existing channel 12 in order to meet code requirements.

The material of the retrofit channel 30 of the embodiment shown and described is code gauge steel (26 gauge to 16 gauge). However, it should be noted that the retrofit channel 30 does not require the attachment of conduit thereto, allowing selection of a thinner gauge material to meet code requirements and providing for savings in material costs. The retrofit channel may be formed on a press break, roll formed, or formed by any other suitable method.

Figure 8:
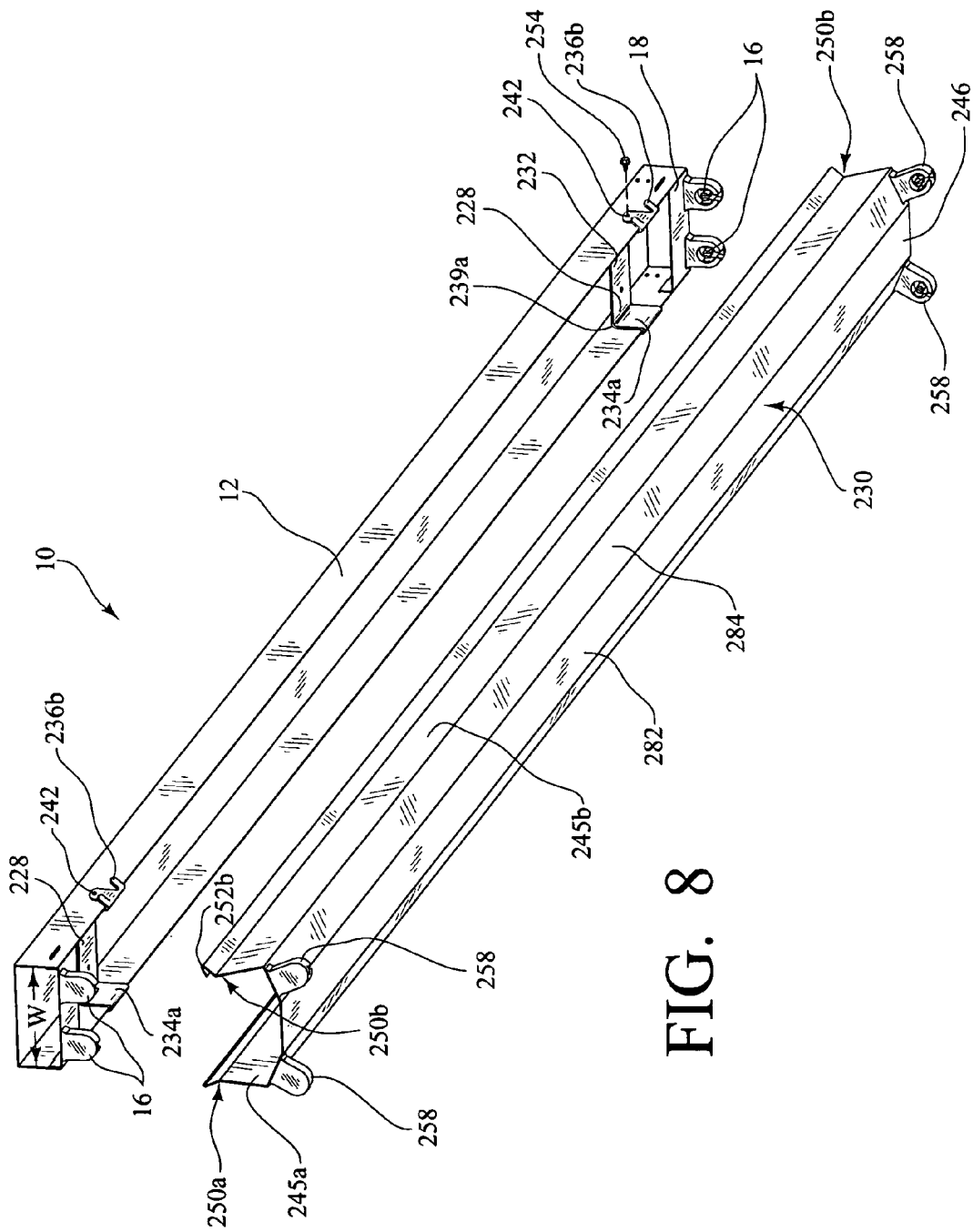
FIG. 8 shows a perspective view of an existing surface mount fluorescent strip light fixture and an embodiment of the retrofit kit, particularly showing the mounting bracket attached to the interior of the existing fixture in alignment with the retrofit channel.

Now, referring to FIG. 8, there is shown an existing surface mount fluorescent strip light fixture 10 and another embodiment of the retrofit kit. This embodiment of the retrofit kit can be placed on the existing surface mount fluorescent strip light fixture 10 previously described. Preparation of the existing strip fixture 10 for retrofitting with the retrofit kit of FIGS. 8-12 and method includes: disconnecting power to the existing strip fixture 10; removing the existing lamps (already removed from the existing fixture shown in FIG. 1); and removing the ballast cover 26. The existing lamps and the ballast cover 26 will be the only components of the existing strip fixture 10 which require disposal in the retrofit process according to the instant invention.

As shown in FIGS. 8-12, the embodiment of the surface mount fluorescent strip light fixture retrofit kit (i.e., assembly or unit) is comprised of a plurality of generally C-shaped mounting brackets 228, preferably two, and a retrofit channel 230. The brackets 228 attach to the interior side or underside of the existing strip channel 12. The retrofit channel 230 hangs from the brackets 228 and wraps around the remaining components of the existing fixture 10.

Figure 9:
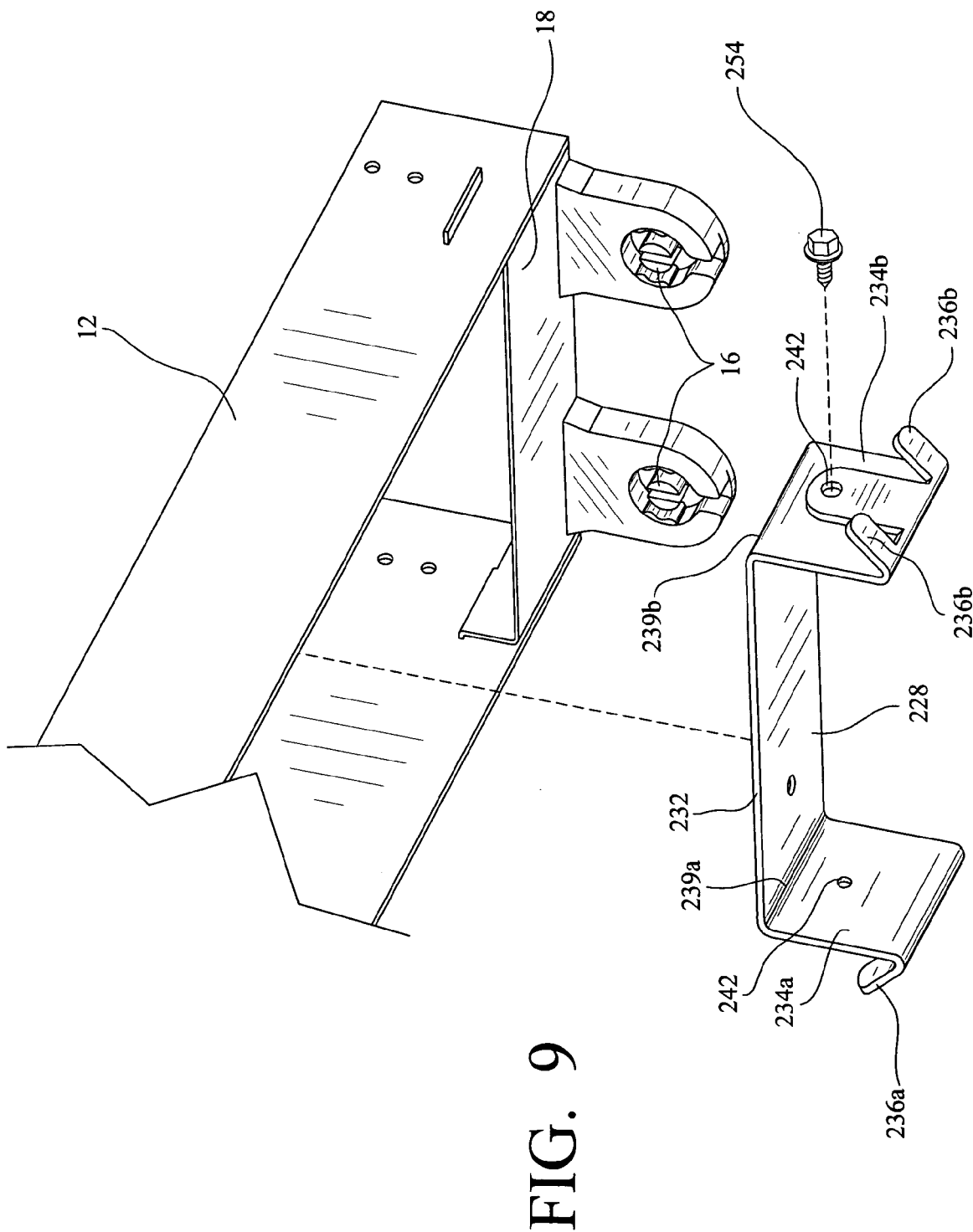
FIG. 9 shows a partial perspective view of the existing surface mount fluorescent strip light fixture, particularly showing the mounting bracket of FIG. 8.

More specifically, as shown in FIG. 9, each mounting bracket 228 has a horizontal arm (or central span) 232, first and second depending legs 234a, 234b on either side of the horizontal arm 232, and first and second upturned hook section 236a, 236b which bend upwards around the bottom edge of the existing channel 12. Since the mounting brackets 228 attach to the bottom of the existing channel 12, the invention will function regardless of the depth of the channel. The horizontal arm 232 has a first end 239a and a second end 239b and a length, L, which is slightly shorter than the width, w, of the existing channel 12. The depending legs 234a, 234b extend downward from the first end 239a and the second end 239b of the horizontal arm 232. The upturned hook sections 236a, 236b extend upward and outward from the bottom end of the depending legs 234a, 234b, forming hook-like structures therewith. The depending legs 234a, 234*b* each have a fastener hole 242. Preferably, the mounting brackets 228 are made of a heavy gauge (16 gauge or 18 gauge) galvanized steel for strength.

The retrofit channel 230, shown more clearly in FIGS. 8 and 10-12, is flexible and has the form of a non-inverted trough, generally, having a first side wall 245*a*, a bottom side (or wall) 246, and second side wall 245*b*. The retrofit channel 230 is proportioned to wrap around the existing fixture 10, including the existing channel 12, lamp holders 16, and ballast 20, without the need to remove or dispose of those components. First and second opposing side walls 245*a*, 245*b* of the retrofit channel 230 have upper ends 250*a*, 250*b*, each with an inwardly and downwardly curved lip 252*a*, 252*b* formed therein. Each lip 252*a*, 252*b* is configured to fit within the upturned hook sections 236*a*, 236*b* of the mounting brackets 282.

The mounting brackets 228 are installed into the existing channel 12 by slipping each bracket 228 up into the existing channel 12 so that the upturned hook sections 236*a*, 236*b* grasp around and underneath the edges of the existing channel 12. Should the selected position for installation of a bracket 228 be obstructed for some reason, an alternate location may be easily selected by relocating the mounting bracket 228 to an alternate location free of obstructions along the existing channel 12. The mounting brackets 228 are positioned in the exact same way, regardless of the mounting structure of the existing fixture 10. Following positioning of the mounting brackets 228 within the existing channel 12, small pilot holes may be created in the existing channel 12 in alignment with the faster holes 242 in the depending legs 234*a*, 234*b* of each mounting bracket 228. Thus, the mounting brackets 228 may be fastened to the existing channel 12 with fasteners, such as teks screws 254, through the fastener holes 242 and the pilot holes. The fastener holes 242 and self drilling screws such as the teks screws 254 allow the facilitate the drilling of the screw through the existing channel 12 and help thread into the heavier gauge material of the mounting bracket 228. More specifically, the teks screws 254 are drilled through the fastener holes 242, which act as a guide and the guide allows the installer to drive the teks screw 254, drill the hole in the existing channel 12, and then make contact with the fastener hole 242 on the opposite side of the mounting bracket 228, and causes the mounting bracket 228 to pinch the existing channel 12 together with the mounting bracket 228.

Figure 10:
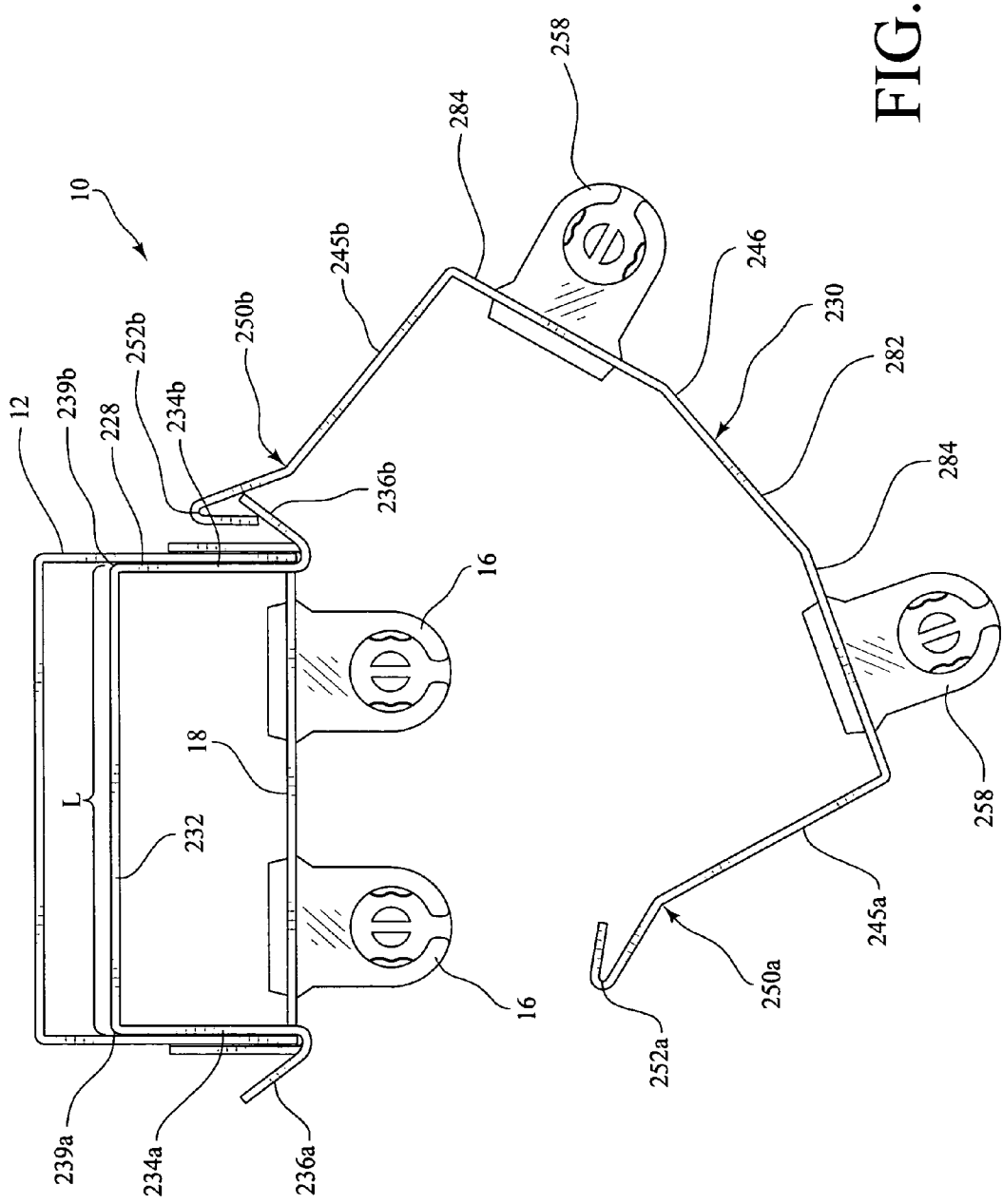
FIG. 10 shows a planar view of the existing surface mount fluorescent strip light fixture and retrofit kit of FIG. 8, particularly showing the retrofit channel hanging on the mounting brackets.

Upon fastening of the mounting brackets 228 to the existing channel 12, the retrofit channel 230 may be hung by either of the inwardly and downwardly curved lip 252*a*, 252*b*, each of which is configured to fit within the upturned hook sections 236*a*, 236*b* of the mounting brackets 282, as best shown in FIG. 10.

Figure 12:
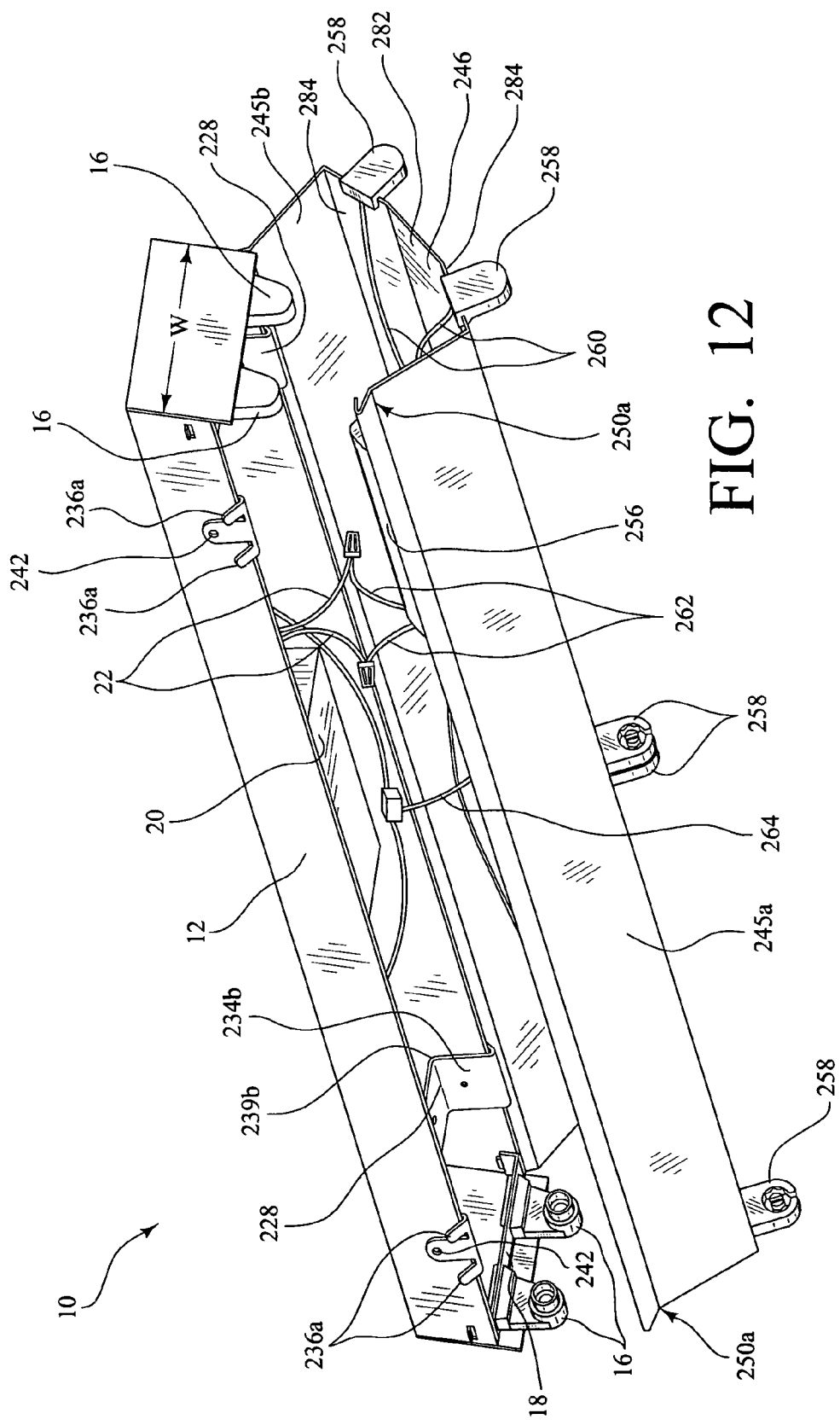
FIG. 12 shows a perspective view of the arrangement of FIG. 10, particularly showing the ballast and ballast wiring of the retrofit kit of FIG. 8.

As shown in FIG. 12, a retrofit ballast 256 and retrofit lamp holders 258 are attached to the interior and exterior, respectively, of the retrofit channel 230, and are connected by retrofit lamp holder wiring 260. The design of the retrofit kit and method of retrofitting of the present invention enables attachment of the retrofit ballast 256 and lamp holders 258, and the connection of the retrofit lamp holder wiring 260 to be performed during the manufacturing of the kit at the factory. Thus, the installer of the kit at the retrofit site does not have to devote time and labor to these tasks. As further shown in FIG. 12, the retrofit ballast 256 has power leads 262 and the retrofit kit has a ground lead 264.

The next step in installation of the retrofit kit is to disconnect the power supply leads 22 from the existing ballast 20 and connect the power supply leads 22 to the retrofit ballast power leads 262. Additionally, the retrofit kit ground lead 264 should be connected to a through feed ground wire or other ground wire in the existing fixture 10.

The mounting bracket upturned hook sections 236*a*, 236*b* and retrofit channel lip 252*a*, 252*b* create a hinge that allows the retrofit channel 230 to hang from the mounting brackets 228 in a position such that the interior portion of the retrofit channel 230 is accessible to the installer for making the described electrical connections, as shown in FIGS. 10 and 12. The center of gravity of the retrofit channel 230 causes the unit to be open to the installer allowing easy access to the power leads 262 and ground leads 264. After the wiring connections have been completed, the retrofit channel 230 may be swung up (as shown more clearly in FIG. 11) such that the inwardly and downwardly curved lip 252*a*, 252*b* locks into the mounting bracket upturned hook section 236*a*, 236*b*. The side walls 245*a*, 245*b* are outwardly flexible, allowing an outward flex over the mounting brackets 228 so that the curved lip 252*a*, 252*b* can lock into the hook section 236*a*, 236*b*. Note that it is feasible that either side 245*a*, 245*b* of the channel 230 could be positioned first.

This embodiment may also include end caps 78 (not shown with respect to this embodiment) such as those shown in FIG. 5, which are configured to close the ends of the retrofitted fluorescent light fixture, or the ends of a row of retrofitted fixtures. The end caps 78 may be attached to the assembly by any convenient means.

Figure 11:
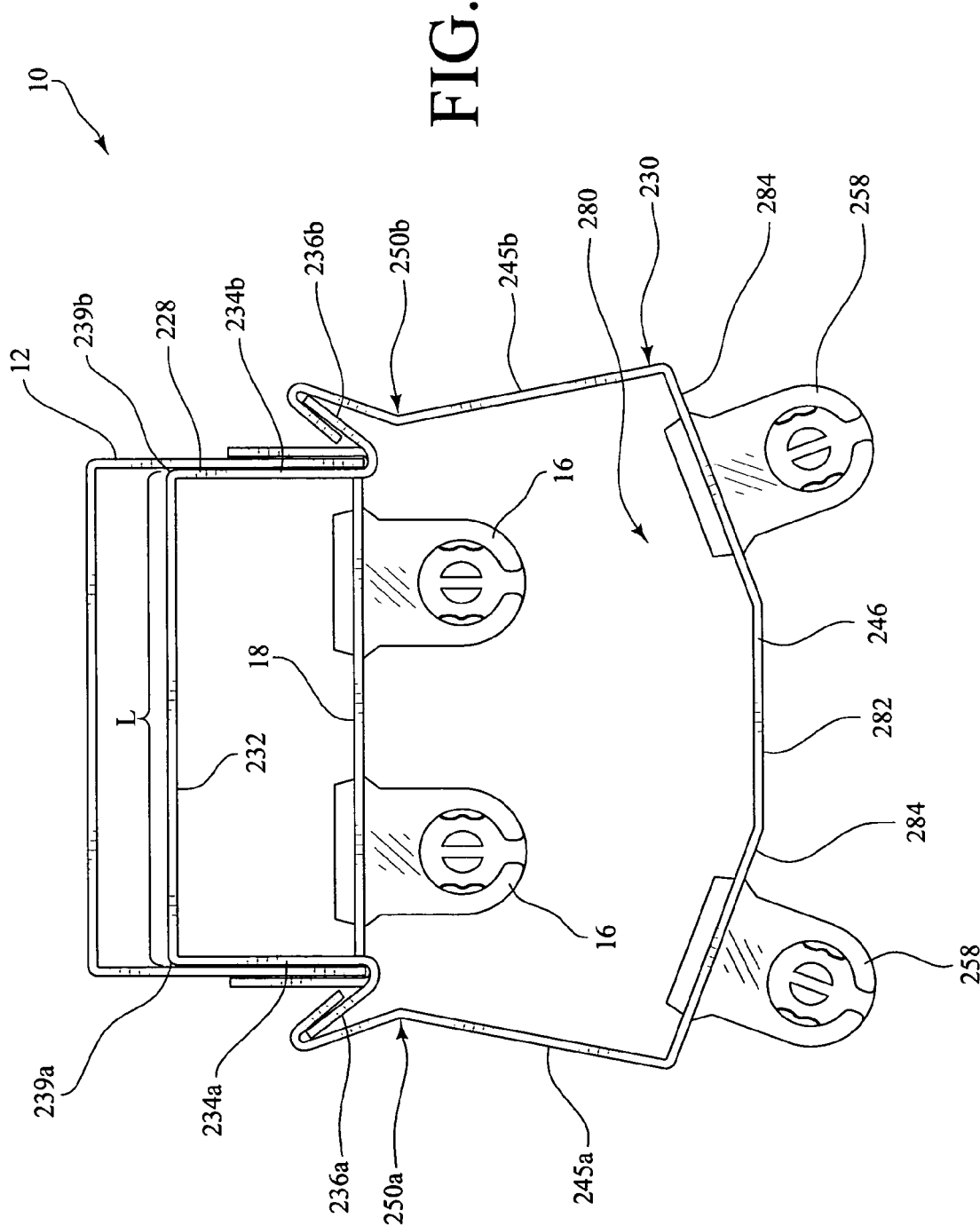
FIG. 11 shows a planar view of the existing surface mount fluorescent strip light fixture and retrofit kit of FIG. 8, particularly showing the retrofit channel in an attached position.

As shown in FIGS. 11 and 12, it is seen that the wrap around arrangement of the retrofit channel 230 and the existing channel 12 and existing lamp holders 16 creates a chamber 280 for the retrofit ballast 256 and associated wiring without requiring the removal of the existing ballast 20 (and the associated disposal issues) and associated wiring (see FIG. 1).

Additionally, as shown in FIG. 11, the wrap around arrangement allows the retrofit channel bottom wall 246 to be wider than the existing channel 12. Thus, on the embodiment shown, the bottom wall may have a flat portion 282 in the middle and angled portions 284 on either side of the flat portion 282. This allows improved optical performance in the two-lamp configuration shown. Additionally, this allows one-lamp and three-lamp versions of the retrofit kit to be produced by the installation of lamp holders and a lamp on the flat portion 282 of the bottom wall 246.

The material of the retrofit channel 230 of the embodiment shown and described is code gauge steel (26 gauge to 16 gauge). However, it should be noted that the retrofit channel 230 does not require the attachment of conduit thereto, allowing selection of a thinner gauge material to meet code requirements and providing for savings in material costs. The retrofit channel may be formed on a press break, roll formed, or formed by any other suitable method.

This description of the invention, including specific dimensions and materials, shall not be construed as a limitation of any invention hereafter claimed by the inventors, as it will be readily apparent to those skilled in the art that design choices may be made without departing from the spirit or scope of the invention.

What is claimed is:

1. A retrofit assembly for a fluorescent lighting fixture comprising:
   an existing fluorescent lighting fixture having an existing ballast and existing plurality of lamp holders;
   a plurality of mounting brackets received within said existing fluorescent lighting fixture;
   a retrofit channel surrounding said existing fluorescent lighting fixture and removably mounted to said mounting brackets; and at least one pair of opposing lamp holders attached to an exterior surface of said retrofit channel.

2. The retrofit assembly of claim 1, wherein said retrofit channel has a plurality of angled portions extending the length of said retrofit channel.

3. The retrofit assembly of claim 1, further comprising end caps removably attached to said retrofit channel.

4. The retrofit assembly of claim 1, further comprising a retrofit ballast attached to an interior surface of said retrofit channel.

5. The retrofit assembly of claim 4, further comprising lamp holder wiring attached to said lamp holders and said retrofit ballast.

6. The retrofit assembly of claim 4, further comprising power leads extending from said retrofit ballast to an interior chamber of said retrofit channel.

7. A method for retrofitting a fluorescent lighting fixture, comprising the steps of:
- disconnecting power to an existing fluorescent lighting fixture;
- removing existing lamps and existing ballast cover from said existing fluorescent lighting fixture;
- mounting a plurality of mounting brackets into said existing fluorescent lighting fixture, wherein said mounting brackets have a first and a second upturned hook section, and wherein said first and second upturned hook sections grasp around and underneath said existing fluorescent lighting fixture;
- hanging a first side wall upper end of a retrofit channel on said plurality of mounting brackets, wherein said first upturned hook sections engage a downwardly turned first lip on said retrofit channel;
- connecting power and ground leads to a retrofit ballast in said retrofit channel;
- swinging up said retrofit channel toward said existing fluorescent lighting fixture; and
- hanging said second side wall upper end of said retrofit channel on said plurality of mounting brackets, wherein said second upturned hook sections engage a downwardly turned second lip on said retrofit channel.

8. A retrofit assembly for a fluorescent lighting fixture comprising:
- a fluorescent lighting fixture having a ballast and a plurality of lamp holders on opposing ends;
- a plurality of mounting brackets mounted on said fluorescent lighting fixture;
- a retrofit channel surrounding said existing fluorescent lighting fixture and removably mounted to said mounting brackets; and
- opposing lamp holders attached to an exterior surface of said retrofit channel.

* * * * *